United States Patent
Kuntze-Fechner et al.

(10) Patent No.: US 10,518,874 B2
(45) Date of Patent: Dec. 31, 2019

(54) MULTI-BLADE ROTOR FOR A ROTARY WING AIRCRAFT

(71) Applicant: AIRBUS HELICOPTERS DEUTSCHLAND GMBH, Donauworth (DE)

(72) Inventors: Gerald Kuntze-Fechner, Gmund am Tegernsee (DE); Martin Ortner, Unterhaching (DE); Victoria Otto, Aix en Provence (FR); Christeline Salmon, Münich (DE); Eugen Rink, Munich (DE); Rupert Pfaller, Riemerling (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 218 days.

(21) Appl. No.: 15/597,252

(22) Filed: May 17, 2017

(65) Prior Publication Data

US 2017/0341742 A1 Nov. 30, 2017

(30) Foreign Application Priority Data

May 25, 2016 (EP) .................................... 16400017

(51) Int. Cl.
*B63H 1/20* (2006.01)
*B64C 27/33* (2006.01)
*B64C 27/48* (2006.01)

(52) U.S. Cl.
CPC .............. *B64C 27/33* (2013.01); *B64C 27/48* (2013.01)

(58) Field of Classification Search
CPC ...... F04D 29/36; B64C 11/343; B64C 11/346
USPC .......................... 416/204 R, 131, 134 A, 135
See application file for complete search history.

(56) References Cited

U.S. PATENT DOCUMENTS

| | | |
|---|---|---|
| 4,344,739 A | 8/1982 | Derschmidt et al. |
| 5,096,380 A | 3/1992 | Byrnes et al. |
| 5,228,834 A | 7/1993 | Yamamoto et al. |
| 5,738,494 A | 4/1998 | Schmaling |
| 5,820,344 A | 10/1998 | Hamilton et al. |
| 7,223,078 B1 * | 5/2007 | Mares ................... F04D 25/088 416/210 R |
| 9,718,542 B2 * | 8/2017 | Kuntze-Fechner ..... B64C 27/33 |
| 9,764,831 B2 * | 9/2017 | Jarrett ..................... B64C 27/35 |
| 9,874,214 B2 * | 1/2018 | Whitley ................ F04D 19/002 |
| 2013/0280076 A1 | 10/2013 | Kuntze-Fechner et al. |

FOREIGN PATENT DOCUMENTS

| | | | |
|---|---|---|---|
| EP | 0019047 | 11/1980 | |
| EP | 2246257 | 11/2010 | |
| FR | 2658565 A1 * | 8/1991 | .............. F03B 3/145 |
| JP | 2010143484 | 7/2010 | |
| WO | 9639327 | 12/1996 | |

OTHER PUBLICATIONS

Extended European Search Report for European Application No. EP 16400017.6, Completed by the European Patent Office, dated Dec. 6, 2016, 9 Pages.

* cited by examiner

*Primary Examiner* — John Kwon
(74) *Attorney, Agent, or Firm* — Brooks Kushman P.C.

(57) ABSTRACT

A multi-blade rotor for a rotary wing aircraft, comprising a plurality of rotor that is connected to an associated rotor head via a plurality of flexbeam elements, wherein at least one flexbeam element of the plurality of flexbeam elements comprises an asymmetrical flexbeam root that is mounted to the associated rotor head.

19 Claims, 5 Drawing Sheets

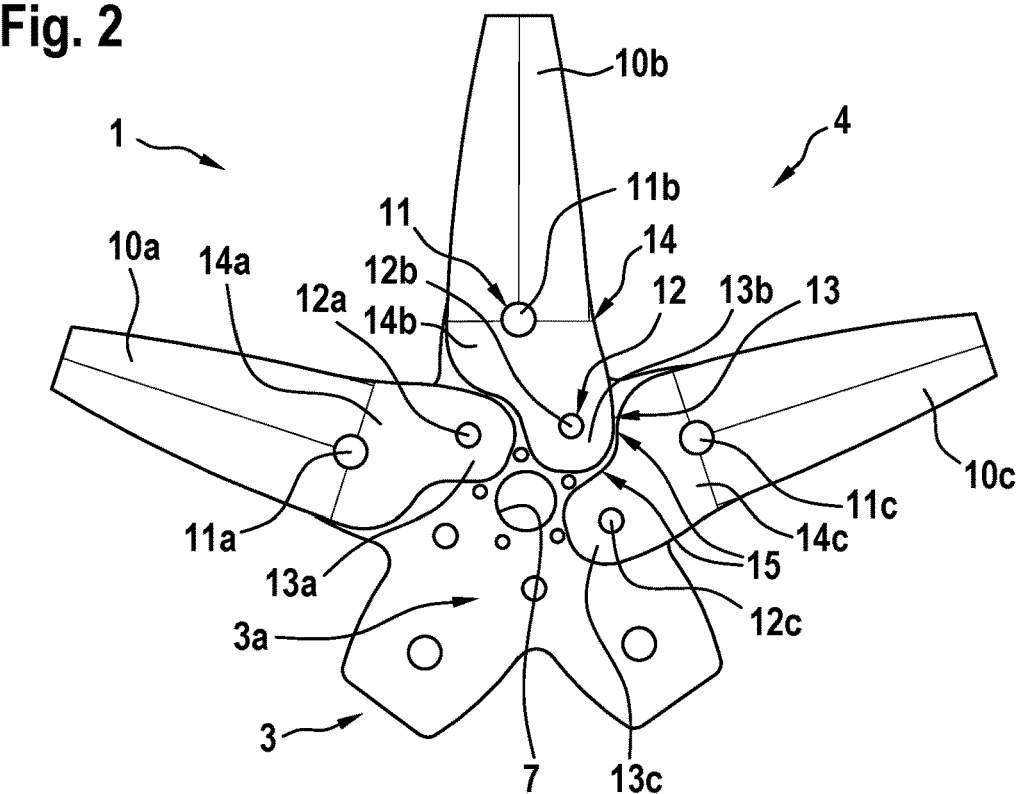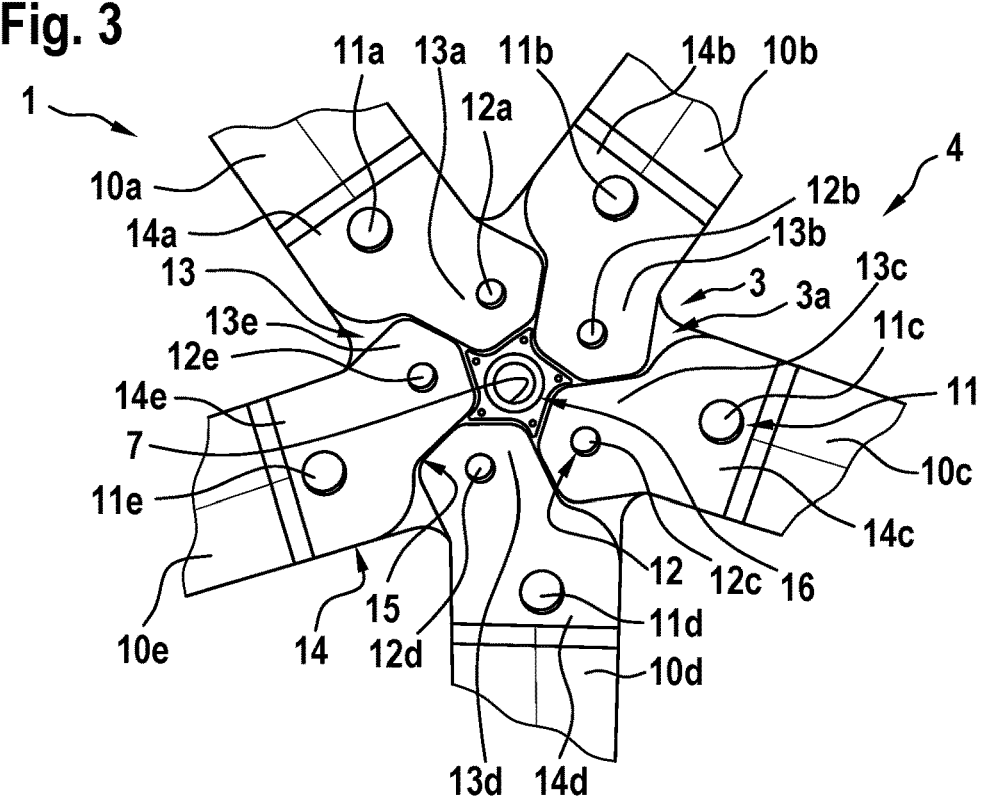

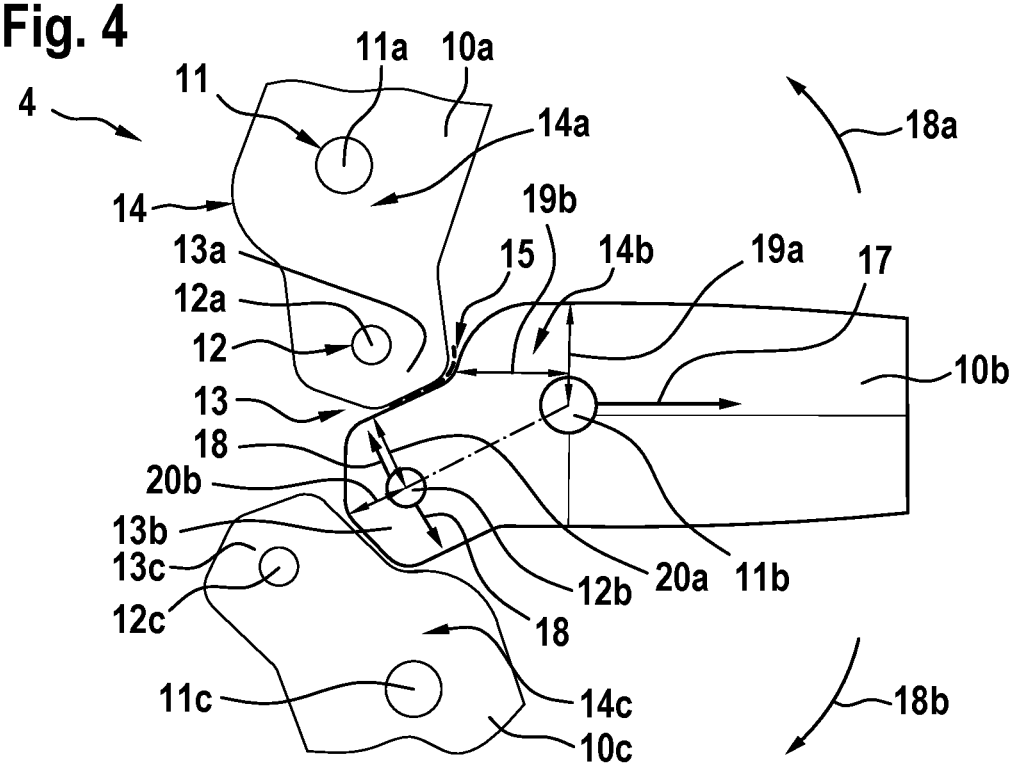
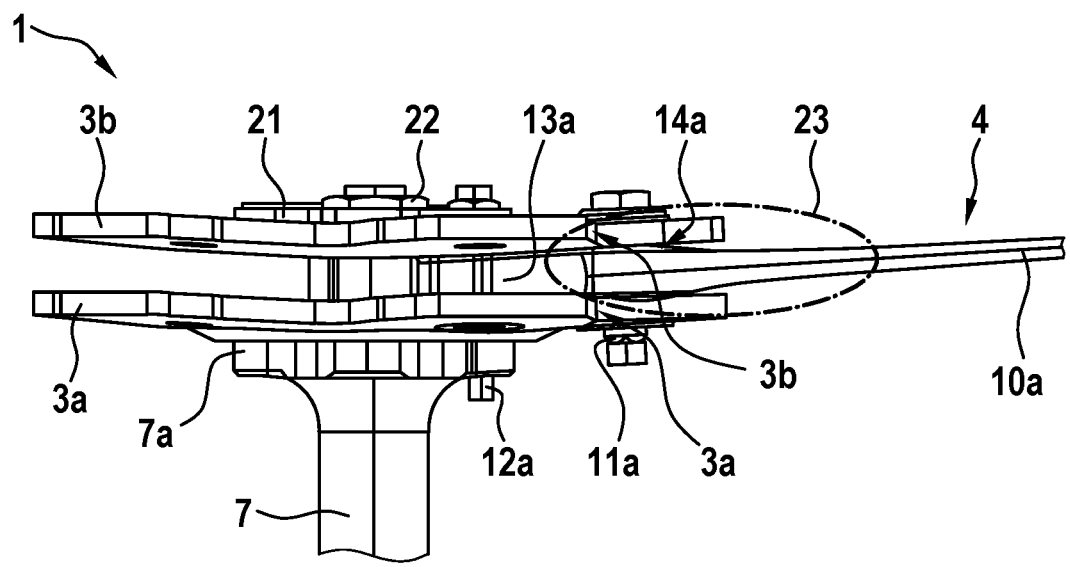

MULTI-BLADE ROTOR FOR A ROTARY WING AIRCRAFT

CROSS-REFERENCE TO RELATED APPLICATIONS

This application claims priority to European patent application No. EP 16400017.6 filed on May 25, 2016, the disclosure of which is incorporated in its entirety by reference herein.

BACKGROUND OF THE INVENTION

(1) Field of the Invention

The invention is related to a multi-blade rotor for a rotary wing aircraft, comprising a plurality of rotor blades that is connected to an associated rotor head via a plurality of flexbeam elements, said multi-blade rotor comprising the features of claim 1. The invention is further related to a flexbeam element comprising the features of claim 15.

(2) Description of Related Art

Flexbeam elements are used in a bearingless or a hinge- and bearingless rotor system to connect rotor blades of a multi-blade rotor of a rotary wing aircraft to an associated rotor mast of the aircraft. During operation, i.e. rotation of the multi-blade rotor, the flexbeam elements must withstand and transfer tremendous centrifugal forces that the rotor blades apply thereto, while permitting their flapping, pitch and lead-lag motions. Therefore, the flexbeam elements comprise special, in particular fiber reinforced composite materials that are flexible enough in torsion to allow twisting for blade movement without discrete bearings in the case of a bearingless or a hinge- and bearingless rotor system.

These flexbeam elements usually possess lead-lag-soft regions that permit motions of associated rotor blades in a bearingless or a hinge- and bearingless rotor system in the lead-lag direction. The lead-lag-soft regions thus constitute fictitious vertically oriented axes, so-called virtual lead-lag hinges, about which the rotor blades execute forward and backward lead-lag motions. Furthermore, these flexbeam elements realize flapwise-soft regions that enable flapping of the associated rotor blades in the vertical direction and, thus, constitute fictitious horizontally oriented axes, so-called virtual flapping hinges, about which the associated rotor blades execute upward and downward flapwise motions in a bearingless or a hinge- and bearingless rotor system. The distance between these virtual flapping hinges and the axis of the rotor mast is referred to as the flapping hinge distance.

In a bearingless or a hinge- and bearingless rotor system, the flapping hinge distance is relatively large. The flapping hinge distance is usually approximately 7 to 12% of a given rotor-disc radius, measured from the axis of the rotor mast radially outward to a tip of a selected rotor blade. A large flapping hinge distance in a bearingless or a hinge- and bearingless rotor system allows, during operation, for a good control response and maneuverability of the rotary wing aircraft, but unfortunately also leads to a high natural flapping frequency and high moments at the rotor mast.

This relatively high natural flapping frequency and especially the high moments transfer corresponding flapping movements of the rotor blade directly into the rotor mast and subsequently into the fuselage. Thus, any control input or disturbances from outside, like e. g. from gusts, result in movements of the fuselage generating inconvenience or discomfort for crew members, passengers and other occupants. Therefore, the bearingless or the hinge- and bearingless rotor systems are disadvantageous in terms of flying characteristics of the rotary wing aircraft. As a consequence, it is preferable to reduce the hinge offset. To reach this target, it is necessary to design flat flapping hinges close to the rotor center. However, in this area the flexbeam attachment to the rotor hub needs to be placed and, therefore, it is extremely difficult to reduce the virtual flapping hinge distance or decrease it below the specific value of about 7%, in particular in order to reach a value of 6%, which is seen as an optimum value with respect to the flying characteristics of the rotary wing aircraft.

Moreover, in a bearingless or a hinge- and bearingless rotor system the flexbeam elements usually comprise torsion weak regions which enable low-force torsional motion of the flexbeam elements for inducing pitch angle adjustments of the rotor blades, and which allow limiting an associated length of the flexbeam elements. Such torsion weak regions must be resistant against lead-lag and flap shear forces and provide a required stiffness in lead-lag and flapping direction for dynamic reasons. Furthermore, such torsion weak regions should have a small cross section in order to reduce an associated drag of these regions.

More specifically, for controlling an associated torsion of the torsion weak regions of the flexbeam elements in order to set a current pitch or blade angle of the rotor blades, suitable control cuffs are associated with the flexbeam elements and, in particular, with the torsion weak regions. The control cuffs are connected to associated root ends of the rotor blades and to associated flexbeam heads of the flexbeam elements at predetermined disconnecting points provided at the flexbeam heads of the flexbeam elements. An underlying radial position of these disconnecting points with respect to the rotor mast of the multi-blade rotor is mainly defined by a given axial length of the control cuffs and the flexbeam elements, and is usually located at a comparatively high radial distance from the rotor mast.

As the control cuffs cause a disturbance of an aerodynamic airflow at the multi-blade rotor, which disturbance increases with the radial distance of the disconnecting points from the rotor mast, the given axial length of the control cuffs and their projected profile need to be reduced in order to reduce an associated aerodynamic drag. Nevertheless, reducing the given axial length of the control cuffs inherently implies reducing an underlying axial length of the flexbeam elements, so that comparatively short and compact flexbeam elements must be provided which allow for a high torsion angle per length unit and which lead to the above described flapping hinge distance of approximately 7 to 12% of a given rotor-disc radius.

Furthermore, the flexbeam elements usually comprise connecting fiber loops by which they are connected in an underlying connection arrangement to a rotor head of the multi-blade rotor. Such a connection is generally performed by means of two identical bolts, both of which are arranged on a line that is perpendicular to a longitudinal extension of a respective flexbeam element, wherein both bolts are adapted for equally taking up centrifugal forces acting on the respective flexbeam element in operation. Respective connection arrangements are illustratively described in the documents JP 2010 143 484 A, U.S. Pat. Nos. 5,096,380 A, 5,820,344 A and 5,228,834 A. But in all of the above described connection arrangements, the flexbeam elements are embodied such that the virtual flapping hinge is comparatively far away from the rotor head, i.e. at a virtual flapping hinge distance having a value of more than 7% of a given rotor-disc radius.

Furthermore, by providing short and compact flexbeam elements that are connected to a given rotor head in such a connection arrangement by means of two bolts that are arranged on a line that is perpendicular to a longitudinal extension of a respective flexbeam element, comparatively stiff connection arrangements are created. Moreover, the connecting fiber loops are generally embodied by fiber loops that are composed of unidirectional glass fibers surrounding the two bolts. However, such connecting loops are usually comparatively high and stiff and, thus, further stiffen the connection arrangement. Furthermore, they are complex and difficult to manufacture, in particular as they require a comparatively short transition region towards the virtual flapping hinge, where the flexbeam element is rather comparatively flat. This transition region must, nonetheless, be constructed such that the unidirectional fibers are not too strongly redirected, as this could undesirably weaken the stiffness of the flexbeam element as such.

The documents EP 0 830 286 A1 and U.S. Pat. No. 5,738,494 A describe connection arrangements, wherein four bolts are used instead of two bolts and wherein the four bolts define two rows of two bolts each. As a consequence, the virtual flapping hinge is even farther away from the rotor head, i. e. again at a virtual flapping hinge distance having a value of more than 7% of a given rotor-disc radius.

BRIEF SUMMARY OF THE INVENTION

It is, therefore, an object of the present invention to provide a multi-blade rotor for a rotary wing aircraft, comprising a plurality of rotor blades that is connected to an associated rotor head via a plurality of flexbeam elements, wherein a virtual flapping hinge distance having a value of less than 7% of a given rotor-disc radius is implemented.

This object is solved by a multi-blade rotor for a rotary wing aircraft, the multi-blade rotor comprising the features of claim 1.

More specifically, according to the invention a multi-blade rotor for a rotary wing aircraft comprises a plurality of rotor blades that is connected to an associated rotor head via a plurality of flexbeam elements. At least one flexbeam element of the plurality of flexbeam elements comprises an asymmetrical flexbeam root that is mounted to the associated rotor head.

It should be noted that in the context of the present invention the term "flexbeam element" refers to an element which is torsion elastic and flexible in order to allow for backward and forward lead-lag motions, flapping movements and pitch angle control movements of an associated rotor blade of the multi-blade rotor. Furthermore, these flexbeam elements are preferably comparatively short, thereby allowing for a rotor blade transition that is comparatively close to a rotor mast of the multi-blade rotor for aerodynamic reasons.

Preferably, an underlying cross section profile center of these flexbeam elements is realized as weak as possible in torsion, but with good resistance against shear forces. The cross section profile center is also preferably as compact or small as possible and easy to manufacture, with only comparatively small geometry changes with respect to associated cross section geometries of flexbeam root and flexbeam head of the flexbeam element.

Furthermore, due to the compactness of the cross section profile center of the flexbeam elements and, in particular, due to the asymmetrical flexbeam root, its overall dimensions and its axial length are at least reduced with respect to conventional flexbeam elements. Moreover, reducing the axial length of the flexbeam element advantageously allows for implementing a control cuff with at least substantially equally reduced axial length. Accordingly, associated disconnecting points where the control cuff is connected to an associated root end of an associated rotor blade and an associated flexbeam head of the flexbeam element can be positioned closer to the rotor mast of the multi-blade rotor, thereby improving aerodynamic performances of the multi-blade rotor. Furthermore, a given profile of an enveloping cuff of the control cuff can be reduced and, thus, designed more compactly, which further improves the aerodynamic performances of the multi-blade rotor.

Advantageously, the asymmetrical flexbeam roots according to the invention allow realization of flexbeam elements and respective mountings thereof to given rotor heads with flapwise-soft regions that enable implementation of virtual flapping hinges with reduced virtual flapping hinge distances of less than 7% of a given rotor-disc radius and, preferably, at least approximately 6% of the given rotor-disc radius. Furthermore, a cost-reduced implementation of the flexbeam elements and the respective mountings can be achieved.

According to a preferred embodiment, the asymmetrical flexbeam root comprises an unbalanced longitudinal extension protruding in a longitudinal direction of the at least one flexbeam element at least approximately towards an associated rotor mast.

According to a further preferred embodiment, the asymmetrical flexbeam root is mounted to the associated rotor head by means of an associated primary bolt that is provided for taking up a main part of centrifugal forces acting on the at least one flexbeam element in operation.

According to a further preferred embodiment, the unbalanced longitudinal extension is mounted to the associated rotor head by means of an associated secondary bolt, the associated secondary bolt being arranged closer to the associated rotor mast than the associated primary bolt in the longitudinal direction of the at least one flexbeam element.

According to a further preferred embodiment, the associated primary bolt and the associated secondary bolt are provided for uniformly taking up lead-lag forces acting on the at least one flexbeam element in operation.

According to a further preferred embodiment, the asymmetrical flexbeam root is attached to a lower and an upper rotor head plate.

According to a further preferred embodiment, the asymmetrical flexbeam root is attached to the lower and upper rotor head plates via the associated primary and secondary bolts.

According to a further preferred embodiment, the asymmetrical flexbeam root and the lower and upper rotor head plates are attached to a rotor mast flange of the associated rotor mast via the associated secondary bolt.

According to a further preferred embodiment, at least one of the lower and upper rotor head plates comprises fiber reinforced composite material.

According to a further preferred embodiment, transversal edge distances of the associated primary bolt in the asymmetrical flexbeam root are greater than transversal edge distances of the associated secondary bolt in the unbalanced longitudinal extension.

According to a further preferred embodiment, a longitudinal edge distance of the associated primary bolt in the asymmetrical flexbeam root is greater than a longitudinal edge distance of the associated secondary bolt in the unbalanced longitudinal extension.

According to a further preferred embodiment, the asymmetrical flexbeam root is formed as a bearing-stress laminate. Thus, the asymmetrical flexbeam root can advantageously be implemented with a reduced height compared to conventional flexbeam roots in fiber loop construction, which allows a cost efficient production. Also, bearing-stress laminates are less prone to defects and constructional errors during manufacturing. Finally, they allow elimination of stiffness critical intermediate regions in connecting regions.

According to a further preferred embodiment, each flexbeam element of the plurality of flexbeam elements comprises an asymmetrical flexbeam root that is mounted to the associated rotor head, wherein each asymmetrical flexbeam root comprises an unbalanced longitudinal extension protruding in a longitudinal direction of an associated one of the plurality of flexbeam elements at least approximately towards an associated rotor mast, and wherein all unbalanced longitudinal extensions define a nested configuration in proximity of the associated rotor mast.

According to a further preferred embodiment, the nested configuration is defined such that in peripheral direction of the associated rotor mast adjacent unbalanced longitudinal extensions retain each other during lead-lag motion in operation. Thus, even if one or more secondary bolts break, functioning of the multi-blade rotor is not compromised due to the nested configuration.

The present invention further provides a flexbeam element for a multi-blade rotor of a rotary wing aircraft with an asymmetrical flexbeam root that is adapted for mounting to the multi-blade rotor.

BRIEF DESCRIPTION OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

FIG. 2 shows a top view of exemplary flexbeam elements that are attached to a rotor head of the multi-blade rotor of FIG. 1, FIG. 3 shows a top view of exemplary flexbeam elements that are attached to the rotor head of FIG. 2, FIG. 4 shows a top view of the flexbeam elements of FIG. 2, FIG. 5 shows a perspective view of one of the flexbeam elements of FIG. 2 to FIG. 4 with rotor head plates of the rotor head of FIG. 2.

DETAILED DESCRIPTION OF THE INVENTION

Figure 1:
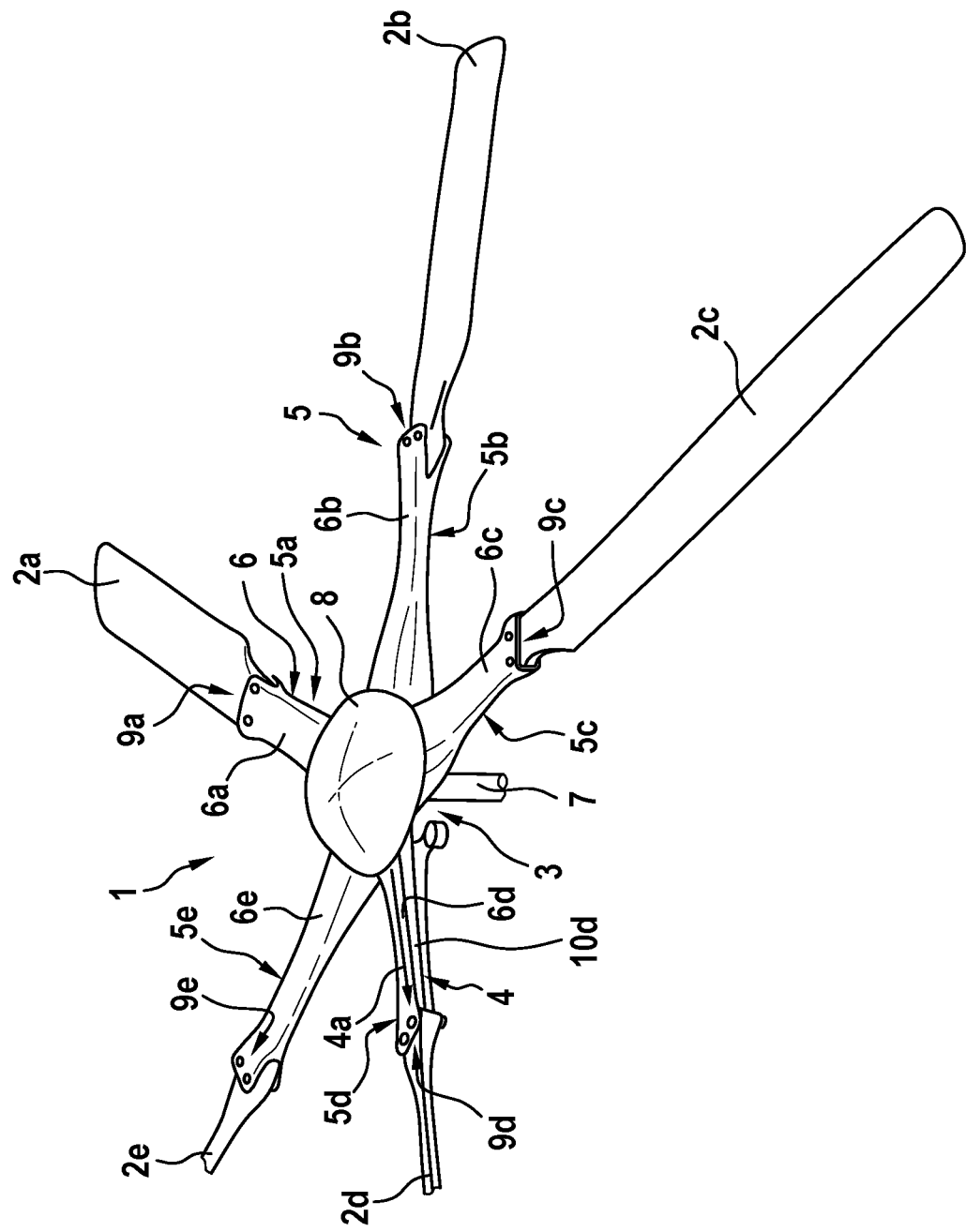
FIG. 1 shows a perspective view of a multi-blade rotor with a plurality of flexbeam elements.

FIG. 1 shows a multi-blade rotor 1 of a rotary wing aircraft, in particular a multi-blade rotor for a main rotor of a helicopter. The multi-blade rotor 1 illustratively comprises a rotor mast 7 that is embodied with a rotor head 3. Furthermore, a rotor head covering cap 8 is provided for covering a central portion of the multi-blade rotor 1 which comprises the rotor head 3.

The multi-blade rotor 1 is preferably embodied as hinge- and bearingless rotor having a plurality of flexbeam elements 4 as interface between the rotor mast 7, i. e. the rotor head 3, and a plurality of rotor blades 2a, 2b, 2c, 2d, 2e. Illustratively, the plurality of flexbeam elements 4 comprises five flexbeam elements (10a, 10b, 10c, 10d, 10e in FIG. 3), each flexbeam element being provided for connecting an associated one of the rotor blades 2a, 2b, 2c, 2d, 2e to the rotor head 3. However, only a single flexbeam element having an associated longitudinal direction 4a is shown in greater detail and designated with the reference sign 10d, for simplicity and clarity of the drawings. The longitudinal direction 4a is hereinafter more generally referred to as the "longitudinal flexbeam direction" 4a.

It should, nevertheless, be noted that these rotor blades 2a, 2b, 2c, 2d, 2e are not shown in greater detail, neither in FIG. 1 nor in the remaining figures. It should further be noted that five rotor blades 2a, 2b, 2c, 2d, 2e are shown by way of example only, and not for limiting the invention accordingly, which can be realized with an arbitrary number of rotor blades, i. e. more generally with two or more rotor blades.

The plurality of flexbeam elements 4 is preferably attached in a suitable manner to the rotor head 3 and defines a plurality of torsion elements 5. By way of example, the plurality of flexbeam elements 4 defines a predetermined number of torsion elements 5a, 5b, 5c, 5d, 5e of the multi-blade rotor 1, such that each one of the torsion elements 5a, 5b, 5c, 5d, 5e is associated with a given rotor blade of the plurality of rotor blades 2a, 2b, 2c, 2d, 2e. Furthermore, each one of the torsion elements 5a, 5b, 5c, 5d, 5e preferably comprises associated disconnecting points 9a, 9b, 9c, 9d, 9e for connection to an associated one of the rotor blades 2a, 2b, 2c, 2d, 2e.

Each one of the torsion elements 5a, 5b, 5c, 5d, 5e is further associated with a control cuff of a plurality 6 of control cuffs 6a, 6b, 6c, 6d, 6e. These control cuffs 6a, 6b, 6c, 6d, 6e are adapted for setting in operation of the multi-blade rotor 1 a current pitch or blade angle of the rotor blades 2a, 2b, 2c, 2d, 2e by controlling a current torsion of the torsion elements 5a, 5b, 5c, 5d, 5e, i. e. of the plurality of flexbeam elements 4. By way of example, the control cuff 6d is driveable for setting the current pitch or blade angle of the rotor blade 2d by controlling the current torsion of the torsion element 5d, i. e. the current torsion of the flexbeam element 10d.

FIG. 2 shows the rotor head 3 of the multi-blade rotor 1 of FIG. 1 with the rotor mast 7 and the plurality of flexbeam elements 4. For simplicity and clarity of the drawings, however, the rotor head 3 is only illustrated with three exemplary flexbeam elements 10a, 10b, 10c of the plurality of flexbeam elements 4.

According to one aspect, at least one and, preferably, each flexbeam element of the plurality of flexbeam elements 4 comprises an asymmetrical flexbeam root that is mounted to the rotor head 3. In other words, the plurality of flexbeam elements 4 is preferably mounted to the rotor head 3 by means of an associated plurality of flexbeam roots 14. Illustratively, the flexbeam elements 10a, 10b, 10c comprise associated asymmetrical flexbeam roots 14a, 14b, 14c that are mounted to the rotor head 3 and preferably formed as bearing-stress laminates.

The plurality of flexbeam roots 14 preferably comprises an associated plurality of longitudinal extensions 13. Illustratively, the flexbeam roots 14a, 14b, 14c comprise associated longitudinal extensions 13a, 13b, 13c that are preferentially also mounted to the rotor head 3.

More specifically, preferably at least one and, preferentially, each asymmetrical flexbeam root 14a, 14b, 14c comprises an unbalanced longitudinal extension 13a, 13b, 13c protruding in the longitudinal flexbeam direction 4a of FIG. 1 at least approximately towards the rotor mast 7. By way of example, each asymmetrical flexbeam root 14a, 14b, 14c is approximately L- or shoe-shaped, i. e. boots-shaped, for defining its associated longitudinal extension 13a, 13b, 13c that is, thus, preferably unbalanced and, therefore, also referred to hereinafter as the "unbalanced longitudinal extension". In other words, each asymmetrical flexbeam root 14a, 14b, 14c is preferably provided as a single-sided protrusion in the longitudinal flexbeam direction 4a.

According to one aspect, the asymmetrical flexbeam roots 14a, 14b, 14c are attached to an associated lower rotor head plate 3a of the rotor head 3. This attachment is preferably performed by means of a plurality of primary bolts 11 and a plurality of secondary bolts 12, as described in more detail below. The lower rotor head plate 3a, in turn, is preferably attached to the rotor mast 7, as described by way of example below with reference to FIG. 5. Preferentially, the lower rotor head plate 3a comprises fiber reinforced composite material.

More specifically, preferably at least one and, preferentially, each one of the asymmetrical flexbeam roots 14a, 14b, 14c is mounted to the associated lower rotor head plate 3a and, thus, to the rotor head 3 by means of an associated primary bolt 11a, 11b, 11c. Each associated primary bolt 11a, 11b, 11c is preferably provided for taking up a main part of centrifugal forces acting on the respective flexbeam element 10a, 10b, 10c in operation, i. e. 60 to 90%.

In addition, preferably at least one and, preferentially, each one of the asymmetrical flexbeam roots 14a, 14b, 14c is mounted to the associated lower rotor head plate 3a and, thus, to the rotor head 3 by means of an associated secondary bolt 12a, 12b, 12c. Each associated secondary bolt 12a, 12b, 12c is preferably arranged closer to the rotor mast 7 than the associated primary bolt 11a, 11b, 11c in the longitudinal flexbeam direction 4a of FIG. 1.

However, both the associated primary bolts 11a, 11b, 11c and the associated secondary bolts 12a, 12b, 12c are preferentially provided for uniformly taking up lead-lag forces acting on the respective flexbeam elements 10a, 10b, 10c in operation. Nevertheless, it should be noted that essentially the lead-lag forces are acting on the associated secondary bolts 12a, 12b, 12c.

FIG. 3 shows the rotor head 3 of the multi-blade rotor 1 of FIG. 2 with the rotor mast 7 and the plurality of flexbeam elements 4, which comprises the plurality of flexbeam roots 14 with the plurality of longitudinal extensions 13, wherein the plurality of flexbeam roots 14 is attached to the lower rotor head plate 3a of the rotor head 3 by means of the plurality of primary bolts 11 and the plurality of secondary bolts 12.

The lower rotor head plate 3a is illustratively provided with an alignment component 16 that is preferably adapted for aligning the lower rotor head plate 3a and, thus, the rotor head 3 on the rotor mast 7. The alignment component 16 may further be adapted for spacing the lower rotor head plate 3a apart from an associated upper rotor head plate (3b in FIG. 5). Thus, the rotor head 3 can be provided as a function group independent of an associated mounting to the rotor mast 7.

However, in contrast to FIG. 2 the plurality of flexbeam elements 4 now illustratively comprises the flexbeam elements 10d, 10e in addition to the flexbeam elements 10a, 10b, 10c of FIG. 2, the plurality of flexbeam roots 14 now illustratively comprises the flexbeam roots 14d, 14e in addition to the flexbeam roots 14a, 14b, 14c of FIG. 2, the plurality of longitudinal extensions 13 now comprises the longitudinal extensions 13d, 13e in addition to the longitudinal extensions 13a, 13b, 13c of FIG. 2, the plurality of primary bolts 11 now comprises the primary bolts 11d, 11e in addition to the primary bolts 11a, 11b, 11c of FIG. 2 and the plurality of secondary bolts 12 now comprises the secondary bolts 12d, 12e in addition to the secondary bolts 12a, 12b, 12c of FIG. 2. More specifically, similar to the flexbeam elements 10a, 10b, 10c, the flexbeam elements 10d, 10e are preferably provided with associated flexbeam roots, i. e. the flexbeam roots 14d, 14e, respectively. The latter are, similar to the flexbeam roots 14a, 14b, 14c, preferably provided with associated longitudinal extensions, i. e. the longitudinal extensions 13d, 13e. The latter are preferably attached to the lower rotor head plate 3a, i. e. the rotor head 3, by means of associated primary and secondary bolts, i. e. the primary bolts 11d, 11e and the secondary bolts 12d, 12e, similar to the attachment as described above with reference to the primary bolts 11a, 11b, 11c and the secondary bolts 12a, 12b, 12c.

Accordingly, each flexbeam element 10a, 10b, 10c, 10d, 10e of the plurality of flexbeam elements 4 comprises an asymmetrical flexbeam root 14a, 14b, 14c, 14d, 14e that is mounted to the rotor head 3. Each asymmetrical flexbeam root 14a, 14b, 14c, 14d, 14e comprises an unbalanced longitudinal extension 13a, 13b, 13c, 13d, 13e protruding in the longitudinal flexbeam direction 4a of FIG. 1 of an associated one of the plurality of flexbeam elements 10a, 10b, 10c, 10d, 10e at least approximately towards the rotor mast 7.

According to one aspect, all unbalanced longitudinal extensions 13a, 13b, 13c, 13d, 13e define a nested configuration in proximity of the rotor mast 7. This nested configuration is preferably defined such that in peripheral direction of the rotor mast 7 adjacent unbalanced longitudinal extensions 13a, 13b, 13c, 13d, 13e retain each other during lead-lag motion of the multi-blade rotor 1 in operation, at least in an emergency case upon rupture of one of the secondary bolts 12a, 12b, 12c, 12d, 12e.

More specifically, according to one aspect a predetermined constriction is embodied between each two adjacent unbalanced longitudinal extensions 13a, 13b, 13c, 13d, 13e in peripheral direction of the rotor mast 7. For clarity and simplicity of the drawings, however, only a single constriction between the longitudinal extensions 13d, 13e is designated with the reference sign 15.

During operation of the multi-blade rotor 1, if the latter is e. g. rotated in FIG. 3 in rearward lead-lag motion direction (18b in FIG. 4), the constriction 15 serves to limit lead-lag motion of the flexbeam elements 10d, 10e, i. e. the associated rotor blades 2d, 2e of FIG. 1 at least in an emergency case as an emergency load path. This is essentially required in case of rupture of one or more of the secondary bolts 12a, 12b, 12c, 12d, 12e.

The limitation is achieved as the longitudinal extension 13d serves as a stopper or blocking element for the lead-lag motion of the longitudinal extension 13e in the emergency case. The latter serves as a stopper or blocking element for the lead-lag motion of the longitudinal extension 13a, and so on.

It should be noted that the unbalanced longitudinal extensions 13a, 13b, 13c, 13d, 13e in FIG. 3 are illustratively polygonal with straight edges. However, different shapings are contemplated and considered as being part of the present invention as long as the above described stopping or blocking effect can be obtained. Consequently, by way of example, in FIG. 2 the unbalanced longitudinal extensions 13a, 13b, 13c, 13d, 13e are shown having rounded edges.

FIG. 4 shows the flexbeam elements 10a, 10b, 10c with the flexbeam roots 14a, 14b, 14c and the longitudinal extensions 13a, 13b, 13c of FIG. 3 for further illustrating the above described stopping or blocking effect that is obtained by means of the nested configuration of the longitudinal extensions 13a, 13b, 13c in an emergency case. As described above, the constrictions 15 defined by the nested configuration serve to limit lead-lag motion of the flexbeam elements 10a, 10b, 10c i. e. the associated rotor blades 2a, 2b, 2c of FIG. 1 during rotation of the multi-blade rotor 1 of FIG. 3 in the emergency case.

In the following, construction and dimensioning of the longitudinal extensions 13a, 13b, 13c are explained in more detail. However, for simplicity and brevity they are only explained with respect to the longitudinal extension 13b of the flexbeam element 10b, representatively for all longitudinal extensions 13a, 13b, 13c, 13d, 13e of FIG. 3.

More specifically, during operation of the multi-blade rotor 1, the flexbeam element 10b and, thus, the longitudinal extension 13b is subjected to centrifugal forces and lead-lag forces. A main loading direction for centrifugal forces is indicated with an arrow 17 and main loading directions for lead-lag motions in forward or rearward lead-lag motion directions 18a, 18b are indicated with arrows 18.

As the centrifugal forces are much higher than the lead-lag forces, a required transversal edge distance 19a of the primary bolt 11b associated with the asymmetrical flexbeam root 14b of the flexbeam element 10b is greater than a required transversal edge distance 20a of the secondary bolt 12b associated with the unbalanced longitudinal extension 13b of the asymmetrical flexbeam root 14b. The required transversal edge distance 19a and the required transversal edge distance 20a preferably amount at least approximately to two times the diameter of the associated primary or secondary bolts 11b, 12b.

Furthermore, a required longitudinal edge distance 19b of the primary bolt 11b associated with the asymmetrical flexbeam root 14b is greater than a longitudinal edge distance 20b of the secondary bolt 12b associated with the unbalanced longitudinal extension 13b. The required longitudinal edge distance 19b preferably amounts at least approximately to two times the diameter of the associated primary bolt 11b and the required longitudinal edge distance 20b preferably amounts at least approximately to two times the diameter of the associated secondary bolt 12b.

The asymmetrical flexbeam root 14b is preferably implemented as a bearing-stress laminate that is flapping-softer than a conventional flexbeam root in fiber loop configuration. However, it requires a greater width. Furthermore, it is necessary to position the primary and secondary bolts 11b, 12b close to the rotor mast 7 of FIG. 3 in order to reduce the virtual flapping hinge distance. Nevertheless, it should be noted that starting from an underlying position of the primary bolt 11b, a reduction of the flexbeam element 10b in an outward direction, i. e. away from the flexbeam root 14b, can be realized. Furthermore, due to a comparatively large implementation of the flexbeam root 14b, an essential part of a flapping moment occurring in operation can be transferred to the rotor mast 7.

FIG. 5 shows the multi-blade rotor 1 of the preceding figures for further illustrating an exemplary connection between the rotor head 3 and the rotor mast 7. However, for simplicity and clarity of the drawings, only the flexbeam element 10 of the preceding figures is shown.

As described above, the flexbeam element 10a is mounted via its flexbeam root 14a that comprises the longitudinal extension 13a to the rotor head 3 via the primary bolt 11a and the secondary bolt 12a. According to one aspect and as can clearly be seen from FIG. 5, the flexbeam root 14a is thicker than the flexbeam element 10a as such, but preferably not more than twice.

The rotor head 3 preferably comprises the lower rotor head plate 3a as described above, and in addition an upper rotor head plate 3b, to which the flexbeam root 14a is also mounted by means of the primary bolt 11a and the secondary bolt 12a. In other words, the flexbeam root 14a is sandwiched between the lower and upper rotor head plates 3a, 3b. Preferentially, the upper rotor head plate 3b also comprises fiber reinforced composite material.

According to one aspect, the rotor head 3 is mounted to the rotor mast 7 via the secondary bolt 12a. More specifically, the rotor mast 7 preferably comprises a flange 7a, which is preferentially an integral part of the rotor mast 7. The lower rotor head plate 3a is preferably positioned on the flange 7a and mounted thereto via the secondary bolt 12a. Thus, loads applied to the rotor mast 7 can be transferred via the secondary bolts 12a, 12b, 12c, 12d, 12e to the rotor head 3 and vice versa.

Furthermore, a fixation plate 21 is preferably positioned on the upper rotor head plate 3b and mounted thereto by means of the secondary bolt 12a. This fixation plate 21 is preferentially retained at the rotor mast 7 by means of an associated mast screw nut 22. Advantageously, the fixation plate 21 allows to distribute pressure applied to the upper rotor head plate 3b, in particular if the latter comprises fiber reinforced composite material.

Thus, the rotor head 3 is firmly and rigidly connected to the rotor mast 7 via the secondary bolt 12a, the flange 7a, the fixation plate 21 and the mast screw nut 22. Furthermore, the mast screw nut 22 is suitable to transfer at least a portion of lifting forces generated from the multi-blade rotor 1 in operation from the rotor head 3 to the rotor mast 7.

It should be noted that use of the above described lower and upper rotor head plates 3a, 3b that preferably comprise fiber reinforced composite material, together with the above described plurality of flexbeam elements 4 with the plurality of flexbeam roots that are implemented as bearing-stress laminates having the plurality of longitudinal extensions 13, advantageously leads to a flapping-soft region 23 that is arranged close to the rotor head 3. This flapping-soft region 23 preferably defines a reduced virtual flapping hinge distance with a value of less than 7% of a given rotor-disc radius, preferably at least approximately 6%.

Figure 6:
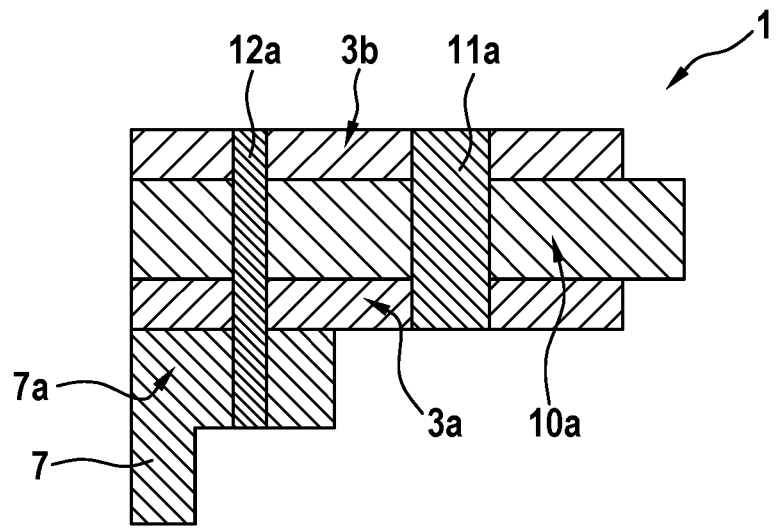
FIG. 6 shows a cross section of a portion of the arrangement of FIG. 5.

FIG. 6 shows the multi-blade rotor 1 of FIG. 5 for further illustrating the exemplary connection between the rotor head 3 and the rotor mast 7. However, for simplicity and clarity of the drawings, illustration of the fixation plate 21 and the screw nut 22 of FIG. 5 is omitted.

In particular, mounting of the flexbeam element 10a that is sandwiched between the lower and upper rotor plates 3a, 3b via the secondary bolt 12a to the flange 7a of the rotor mast 7 is clarified. Furthermore, implementation of the flange 7a as an integral part of the rotor mast 7 is also further illustrated.

Figure 7:
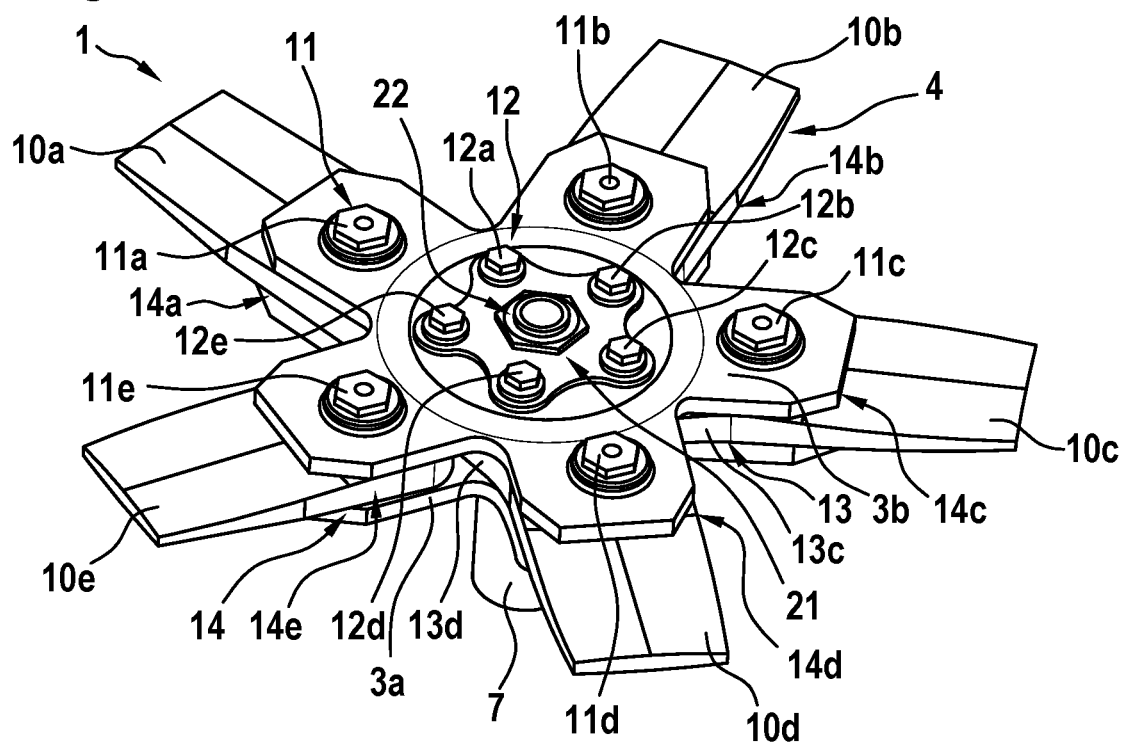
FIG. 7 shows a perspective view onto an upper side of the arrangement of FIG. 5 with an upper rotor head plate.

FIG. 7 shows the multi-blade rotor 1 of FIG. 5 from an upper side for further illustrating the exemplary connection between the rotor head 3 and the fixation plate 21, as well as the exemplary connection between the screw nut 22 and the rotor mast 7. FIG. 7 also further illustrates the sandwiched arrangement of the plurality of flexbeam roots 14 between the lower and upper rotor head plates 3a, 3b, wherein preferably each asymmetrical flexbeam root 14a, 14b, 14c, 14d, 14e of the plurality of flexbeam roots 14 is attached to the lower and upper rotor head plates 3a, 3b, preferentially via the primary bolts 11a, 11b, 11c, 11d, 11e and secondary bolts 12a, 12b, 12c, 12d, 12e.

According to one aspect, the primary bolts 11a, 11b, 11c, 11d, 11e are provided with comparatively large bolt heads for pressure distribution and they define at least approximately a first virtual circle on which they are arranged, and the secondary bolts 12a, 12b, 12c, 12d, 12e define at least approximately a second virtual circle on which they are arranged. Preferably, the second virtual circle has a diameter that is greater than a diameter of the first virtual circle, preferentially at least more than twice.

FIG. 7 finally also further illustrated a required different dimensioning of the primary bolts 11a, 11b, 11c, 11d, 11e and secondary bolts 12a, 12b, 12c, 12d, 12e. As described above, the primary bolts 11a, 11b, 11c, 11d, 11e must withstand the totality of the centrifugal forces occurring in operation, while the secondary bolts 12a, 12b, 12c, 12d, 12e only need to withstand the lead-lag forces in operation, which are significantly smaller than the centrifugal forces. Thus, compared to the primary bolts 11a, 11b, 11c, 11d, 11e, the secondary bolts 12a, 12b, 12c, 12d, 12e can be implemented with reduced dimensions, i. e. in particular with a reduced diameter, as illustrated.

Figure 8:
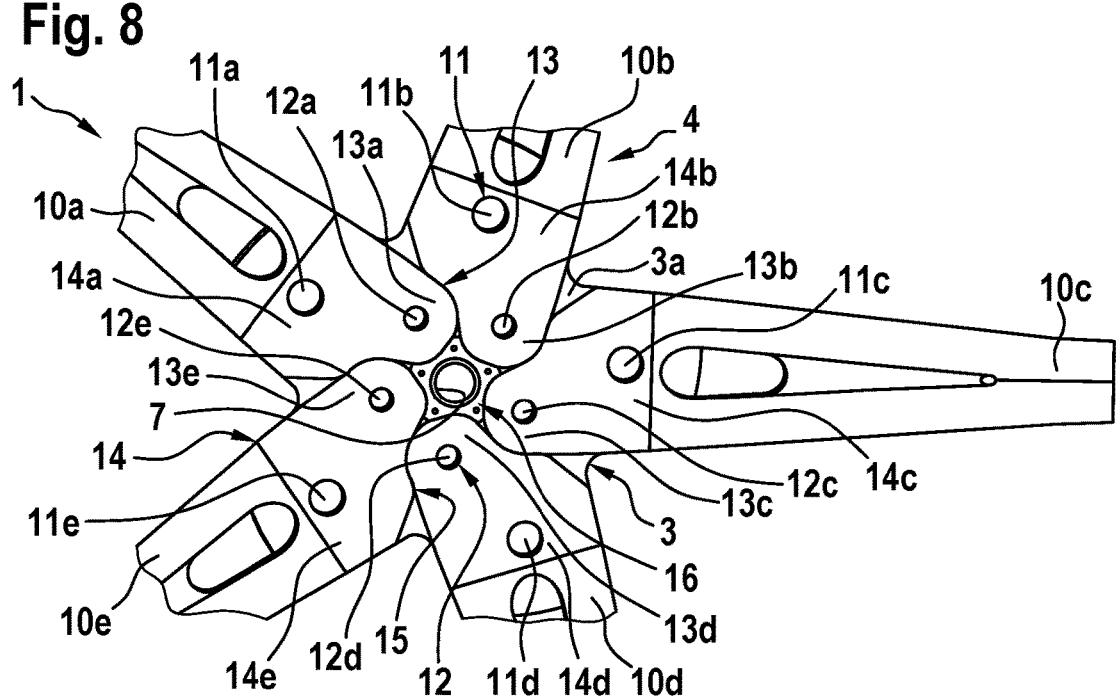
FIG. 8 shows a top view of the arrangement of FIG. 7 without the upper rotor head plate.

FIG. 8 shows the multi-blade rotor 1 of FIG. 3 for further illustrating an exemplary nested configuration of the asymmetrical flexbeam roots 14a, 14b, 14c, 14d, 14e of the plurality of asymmetrical flexbeam roots 14. Also, a further possible shaping of the asymmetrical flexbeam roots 14a, 14b, 14c, 14d, 14e with a combination of rounded and straight edges is illustrated.

Figure 9:
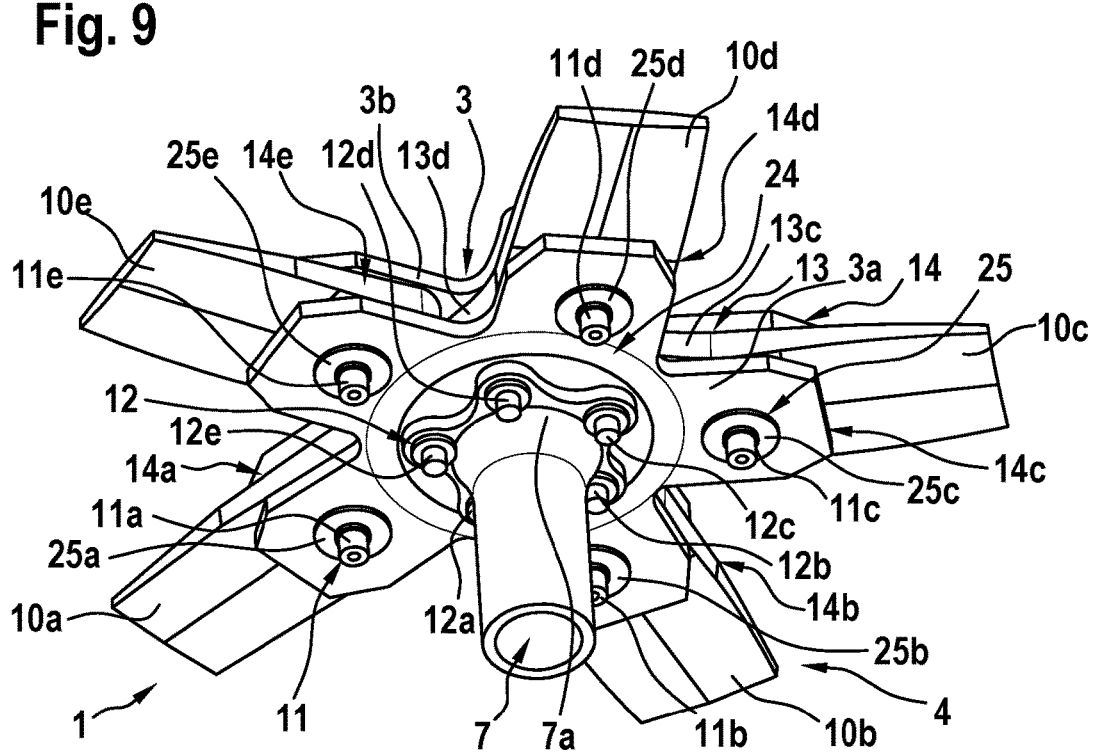
FIG. 9 shows a perspective view onto a lower side of the arrangement of FIG. 7.

FIG. 9 shows the multi-blade rotor 1 of FIG. 7 from a lower side for further illustrating an exemplary realization of the lower rotor head plate 3a, which preferably comprises a reinforcement section 24. By way of example, this reinforcement section 24 is annular and, preferentially, arranged in a transition region between finger- or arm-like outer extensions, where the plurality of primary bolts 11 is attached, and a circular inner region, where the flange 7a of the rotor mast 7 is attached. Provision of this reinforcement section 24 advantageously allows redirection of underlying roving layers from each one of the finger- or arm-like outer extensions into a next one, seen in peripheral direction of the lower rotor head plate 3a.

It should be noted that the reinforcement section 24 is only described with respect to the lower rotor head plate 3a. However, the upper rotor head plate 3b is preferably similarly embodied and, thus, also comprises such a reinforcement section.

According to one aspect, the plurality of primary bolts 11 is arranged within a plurality of bushings 25, which are adapted for centering and guiding the plurality of primary bolts 11 during mounting. Preferably, at least one of the primary bolts 11a, 11b, 11c, 11d, 11e of the plurality of primary bolts 11 is arranged within an associated bushing 25a, 25b, 25c, 25d, 25e of the plurality of bushings 25.

It should be noted that the above described, preferred embodiments are merely described to illustrate possible embodiments of the present invention, but not in order to restrict the present invention thereto. Instead, multiple modifications and variations of the invention are possible and should, therefore, also be considered as being part of the invention.

REFERENCE LIST 1 multi-blade rotor
2a, 2b, 2c, 2d, 2e rotor blades
3 rotor head
3a lower rotor head plate
3b upper rotor head plate
4 plurality of flexbeam elements
4a flexbeam longitudinal direction
5 plurality of torsion elements
5a, 5b, 5c, 5d, 5e torsion elements
6 plurality of control cuffs
6a, 6b, 6c, 6d, 6e control cuffs
7 rotor mast
7a rotor mast flange
8 rotor head covering cap
9a, 9b, 9c, 9d, 9e disconnecting points
10a, 10b, 10c, 10d, 10e flexbeam elements
11 plurality of primary bolts
11a, 11b, 11c, 11d, 11e primary bolts
12 plurality of secondary bolts
12a, 12b, 12c, 12d, 12e secondary bolts
13 plurality of longitudinal extensions
13a, 13b, 13c, 13d, 13e longitudinal extensions
14 plurality of flexbeam roots
14a, 14b, 14c, 14d, 14e flexbeam roots
15 constrictions
16 alignment component
17 main loading direction for centrifugal forces
18 main loading directions for lead-lag forces
18a forward lead-lag motion direction
18b rearward lead-lag motion direction
19a primary bolt transversal edge distance
19b primary bolt longitudinal edge distance
20a secondary bolt transversal edge distance
20b secondary bolt longitudinal edge distance
21 fixation plate
22 mast screw nut
23 flapping-soft region
24 reinforcement section
25 plurality of primary bolt bushings
25a, 25b, 25c, 25d, 25e primary bolt bushings

What is claimed is:
1. A multi-blade rotor for a rotary wing aircraft, comprising:
a plurality of rotor blades that is connected to an associated rotor head via a plurality of flexbeam elements, wherein at least one flexbeam element of the plurality of flexbeam elements comprises an asymmetrical flexbeam root that is extending in a longitudinal direction of the flex-beam element and being approximately L-shaped or shoe-shaped and comprising a single-sided longitudinal extension oriented at least approximately towards the associated rotor head, the asymmetrical flexbeam root being mounted to the associated rotor head.

2. The multi-blade rotor according to claim 1, wherein the asymmetrical flexbeam root is mounted to the associated rotor head by means of an associated primary bolt that is provided for taking up a main part of centrifugal forces acting on the at least one flexbeam element in operation.

3. The multi-blade rotor according to claim 2, wherein the unbalanced longitudinal extension is mounted to the associated rotor head by means of an associated secondary bolt, the associated secondary bolt being arranged closer to the associated rotor mast than the associated primary bolt in the longitudinal direction of the at least one flexbeam element.

4. The multi-blade rotor according to claim 3, wherein the associated primary bolt and the associated secondary bolt are provided for uniformly taking up lead-lag forces acting on the at least one flexbeam element in operation.

5. The multi-blade rotor according to claim 3, wherein the asymmetrical flexbeam root is attached to a lower and an upper rotor head plate.

6. The multi-blade rotor according to claim 5, wherein the asymmetrical flexbeam root is attached to the lower and upper rotor head plates via the associated primary and secondary bolts.

7. The multi-blade rotor according to claim 6, wherein the asymmetrical flexbeam root and the lower and upper rotor head plates are attached to a rotor mast flange of the associated rotor mast via the associated secondary bolt.

8. The multi-blade rotor according to claim 6, wherein at least one of the lower and upper rotor head plates comprises fiber reinforced composite material.

9. The multi-blade rotor according to claim 3, wherein transversal edge distances of the associated primary bolt in the asymmetrical flexbeam root are greater than transversal edge distances of the associated secondary bolt in the unbalanced longitudinal extension.

10. The multi-blade rotor according to claim 9, wherein a longitudinal edge distance of the associated primary bolt in the asymmetrical flexbeam root is greater than a longitudinal edge distance of the associated secondary bolt in the unbalanced longitudinal extension.

11. The multi-blade rotor according to claim 1, wherein the asymmetrical flexbeam root is formed as a bearing-stress laminate.

12. The multi-blade rotor according to claim 1, wherein the single-sided longitudinal extensions define a nested configuration in proximity of the associated rotor mast.

13. The multi-blade rotor according to claim 12, wherein the nested configuration is defined such that in peripheral direction of the associated rotor mast adjacent single-sided longitudinal extensions retain each other during lead-lag motion in operation.

14. A flexbeam element for a multi-blade rotor of a rotary wing aircraft, comprising:

an asymmetrical flexbeam root that is extending in a longitudinal direction of the flex-beam element and being approximately L-shaped or shoe-shaped and comprising a single-sided longitudinal extension oriented at least approximately towards the associated rotor head, the asymmetrical flexbeam root being adapted for mounting to the multi-blade rotor.

15. A multi-blade rotor for a rotary wing aircraft comprising:
a rotor head;
a plurality of rotor blades extending from the rotor head;
a plurality of flexbeam elements, connecting the plurality of rotor blades to the rotor head, wherein each flexbeam element extends in a longitudinal direction between a rotor head connected to each rotor blade and an assymetrical flexbeam root connected to the rotor head, each assymetrical flexbeam root comprising:
a longitudinal extension protruding in the longitudinal direction at least approximately towards a rotor mast offset from a central longitudinal axis of the flexbeam element; and
a nested cavity opposite the longitudinal extension in a transverse direction, wherein the nested cavity is shaped to receive the longitudinal extension of an adjacent one of the plurality of flexbeam elements to define a nested configuration,
wherein the nested configuration is adapted to limit lead-lag motion in an emergency.

16. The multi-blade rotor according to claim 15, wherein the asymmetrical flexbeam root is mounted to the rotor head a primary bolt and a secondary bolt provided for taking up centrifugal forces acting on the at least one flexbeam element in operation, the primary bolt positioned along the central longitudinal axis, and the secondary bolt positioned along the longitudinal extension and arranged closer to the rotor mast than the primary bolt in the longitudinal direction of the at least one flexbeam element.

17. The multi-blade rotor according to claim 16, wherein transversal edge distances of the primary bolt in the asymmetrical flexbeam root are greater than transversal edge distances of the secondary bolt along the longitudinal extension.

18. The multi-blade rotor according to claim 9, wherein a longitudinal edge distance of the primary bolt in the asymmetrical flexbeam root is greater than a longitudinal edge distance of the secondary bolt in the longitudinal extension.

19. The multi-blade rotor according to claim 1, wherein the asymmetrical flexbeam root is formed of a bearing-stress laminate.

* * * * *